(12) United States Patent
Saunier

(10) Patent No.: US 8,051,299 B2
(45) Date of Patent: Nov. 1, 2011

(54) COMPUTER SECURITY METHOD AND COMPUTER SYSTEM

(75) Inventor: Louisa Saunier, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1247 days.

(21) Appl. No.: 11/378,304

(22) Filed: Mar. 20, 2006

(65) Prior Publication Data
US 2007/0220500 A1 Sep. 20, 2007

(51) Int. Cl.
*H04L 29/00* (2006.01)
(52) U.S. Cl. .................. 713/187; 713/185; 713/186
(58) Field of Classification Search .................. 713/187
See application file for complete search history.

(56) References Cited

U.S. PATENT DOCUMENTS

| | | | |
|---|---|---|---|
| 5,224,160 A * | 6/1993 | Paulini et al. ................. | 713/187 |
| 5,421,006 A * | 5/1995 | Jablon et al. .................... | 714/36 |
| 5,448,641 A * | 9/1995 | Pintsov et al. .................. | 380/51 |
| 5,841,870 A * | 11/1998 | Fieres et al. .................... | 713/156 |
| 5,944,821 A | 8/1999 | Angelo | |
| 5,978,475 A * | 11/1999 | Schneier et al. .............. | 713/177 |
| 6,006,328 A | 12/1999 | Drake et al. | |
| 6,105,137 A * | 8/2000 | Graunke et al. ................ | 726/24 |
| 6,141,698 A * | 10/2000 | Krishnan et al. .............. | 719/331 |
| 6,226,749 B1 | 5/2001 | Carloganu et al. | |
| 6,327,660 B1 * | 12/2001 | Patel .............................. | 713/193 |
| 6,405,315 B1 * | 6/2002 | Burns et al. ................... | 713/190 |
| 6,567,917 B1 * | 5/2003 | Ziese ............................. | 713/187 |
| 6,802,006 B1 * | 10/2004 | Bodrov ......................... | 713/187 |
| 6,922,778 B2 * | 7/2005 | Hild et al. ..................... | 713/181 |
| 6,983,366 B1 * | 1/2006 | Huynh et al. ................. | 713/168 |
| 7,069,445 B2 * | 6/2006 | Cheston et al. ............... | 713/187 |
| 2001/0037450 A1 * | 11/2001 | Metlitski et al. .............. | 713/152 |
| 2004/0107368 A1 * | 6/2004 | Colvin .......................... | 713/202 |
| 2004/0158742 A1 * | 8/2004 | Srinivasan et al. ........... | 713/201 |
| 2005/0114687 A1 * | 5/2005 | Zimmer et al. ............... | 713/193 |

OTHER PUBLICATIONS

European Patent Office Search Report from co-pending EU Application No. 05300198,8-PCT/ having a date of mailing of Oct. 6, 2005 (9 pgs).

* cited by examiner

*Primary Examiner* — Nasser Moazzami
*Assistant Examiner* — Ghazal Shehni

(57) ABSTRACT

A method for secure loading, integrity checking of the runtime image and control over the runtime execution of applications which ensures that a software application loads only code it was authorized to load, and that the software application is monitored for unauthorized modifications of the runtime image. The method proposed can be used as a basis for further enforcing of authorization rules during the execution of an application, e.g. for Digital Rights Management.

20 Claims, 4 Drawing Sheets

COMPUTER SECURITY METHOD AND COMPUTER SYSTEM

FIELD OF THE INVENTION

The present invention relates to the field of computer systems and methods, and more particularly without limitation to the field of computer security.

This application claims priority to copending Europe utility application entitled, "A Computer Security Method And Computer System" having serial no. EP 05300198.8, filed Mar. 18, 2005, which is entirely incorporated herein by reference.

BACKGROUND AND PRIOR ART

Over the last two decades, the functionality and convenience of computers has improved steadily. An ever growing number of interconnected computers and mobile devices are used to perform important tasks in many areas of society and in the daily lives of a growing number of people. This development, however beneficial, brings with it new vulnerabilities and concerns for security. A central problem is to allow a user to establish trust in the integrity of a computer system, or more particularly, in the integrity of a software application used for an important or sensitive purpose.

The integrity of a computer system depends not only on the integrity of the data in the non-volatile memory such as ROM or disks but also on the integrity of the runtime image in volatile memory such as RAM. The integrity of the runtime image can be corrupted due to intentional or non-intentional modifications of this image even if the static integrity of the executables before loading is guaranteed. Relevant vulnerabilities include loading of unauthorized code, buffer overflow, insufficient input validation, or, on Microsoft Windows platforms, security attacks based on a technique known as "DLL injection" where a remote process can write to the address space of a running application. Even with genuine code such as some system tools the runtime image of an application can be modified in an unauthorized manner. Since modifications can occur at any time, it is impossible to ensure a dynamic integrity of the runtime image of a software application with a single authentication before execution.

One prior art method for "secure software registration and integrity assessment in a computer system" is described in U.S. Pat. No. 5,944,821. A loader compares hash values of software applications before execution to previously prepared hash values in secure storage. Since no integrity checks during execution are performed, a dynamic integrity of the runtime image cannot be achieved.

The 2003 Microsoft Professional Developers Conference release of Microsoft Corporation's Next-Generation Secure Computing Base technologies for the Microsoft Windows family of operating systems is described in a white paper available at the Microsoft Developer Network library (http://msdn.microsoft.com/library/en-us/dnsecure/html/nca_considerations.asp). The computing environment is divided into two separate and distinct operating modes. Users can perform routine tasks in Standard mode using their existing applications, services, and devices. For their high-security tasks, those same users can run trusted, authenticated Nexus computing agents that execute in a separate and protected operating environment called Nexus mode. While Nexus mode protects Nexus computing agents from any harmful programs that may be running in Standard mode, within Nexus mode a Nexus security kernel uses standard virtual memory protections to isolate itself from Nexus computing agents and to isolate Nexus Computing agents from one another.

SUMMARY OF THE INVENTION

In accordance with the present invention there is provided a computer security method comprising loading a software application from a non-volatile memory in a volatile memory of a computer system by a secure loader, performing a first authentication of the software application, starting execution of the software application after its first authentication, and performing a second authentication of the software application during its execution.

Embodiments of the present invention are particularly advantageous as they enables to ensure not only the integrity of data stored in non-volatile memory but also the integrity of the runtime environment in volatile memory.

For example, the invention can help a user of a computer system ensure the integrity of software applications running on his or her platform. In another possible scenario the user can be prevented from executing an application in a way he or she is not explicitly authorized for, as is a common requirement in digital rights management.

In accordance with an embodiment of the invention the second authentication is performed repeatedly during the execution of the software application, for example at constant or variable time intervals. This has the advantage that unauthorized changes in the runtime environment occurring during the execution of the software application are detected after the passing of the current time interval. Such unauthorized changes may for example be caused by buffer overflow or insufficient input validation. A shorter time interval will lead to faster detection, and therefore higher security. Additionally or alternatively repeating the second authentication whenever new code sections are loaded into volatile memory or released from it by the software application has the advantage that unauthorized changes in the runtime environment at such events, for example caused by dynamically loaded unauthorized code, are detected before such code can be executed.

In accordance with an embodiment of the invention a digital certificate accompanies the software application, preferably in the form of a separate file on disk, for example in XML format, digitally signed by an authority trusted by the platform owner. The certificate is loaded and the software application authenticated using the information from the certificate.

In accordance with an embodiment of the invention the digital certificate lists hash values of code sections allowed to be loaded by the application; an assumption is that all pieces of code the application loads should be declared in the application's certificate. Each hash value itself is digitally signed by an authority trusted by the platform owner.

In accordance with an embodiment of the invention the second authentication of the software application is performed by authenticating a snapshot of the current image of the software application in volatile memory. The current image of the software application is read from the volatile memory. For each code section, the current hash value is then calculated from the image. The authentication is successful if each of the calculated hash value matches one of the hash values listed in the certificate. Either at regular intervals, or at any time a new code section is loaded or unloaded dynamically the application process is suspended, a new snapshot taken and authenticated.

In accordance with an embodiment of the invention the authentication method is adapted to take into account any genuine modifications that under some operating systems are applied to the runtime image of a code section after or during loading it in the volatile memory. This is achieved by reverse transforming the code of a code section after reading it from the volatile memory and before calculating its current hash value.

In accordance with an embodiment of the invention the genuine modifications are fix-ups of code that is not independent of its position in the volatile memory. For example, dynamically linked libraries on Microsoft Windows platforms often contain code that is not position-independent and has to be modified if the library is loaded at an address other than its preferred address.

In accordance with an embodiment of the invention the certificate comprises authorization rules limiting the right of the user to execute the software application in a way he or she is not explicitly authorized for. For example, the execution of the software application can be bound to a specific machine or a specific user; it is possible to limit the number of allowed executions, allow only parts of the application to be used on a particular platform, or execution during a given timeframe. An authorization rule may also allow dynamic loading of code sections from a library or executable signed by a specified, trusted software provider. The signature can be attached to the library or executable file in a special section.

In accordance with an embodiment of the invention the computer system comprises a cryptographic unit that directly controls loading and execution of the software application, which has to be separated into a first and a second part. The cryptographic unit provides cryptographic capabilities, secure storage, and authentication capabilities. The following protocol by which the cryptographic unit starts the software application requires that the cryptographic unit and the first part of the software application share a secret key and are able to independently calculate a keyed-hash message authentication code with it.

First, the cryptographic unit creates a token specifying a timeout and comprising information necessary for establishing a secure communication channel. The cryptographic unit inserts the token into a software verification function it stores, and calculates the keyed hash from the resulting bytes using the secret key shared with the first part of the software application. The cryptographic unit then provides the software verification function and its keyed hash to the first part of the software application. The first part of the software application verifies the keyed hash to authenticate the received software verification function and passes control to it. The software verification function then provides back the token to the cryptographic unit, before the token's timeout expires. The software verification function then passes control to the second part of the software application and provides the token to it. The second part of the software application then uses the token to establish a secure communication channel with the cryptographic unit.

In accordance with an embodiment of the invention, the second part of the software application comprises an encrypted section. After having sent the token back to the cryptographic unit, the software verification function requests the decryption of the encrypted section from the cryptographic unit.

In accordance with an embodiment of the invention the described protocol for starting the software application by the cryptographic unit is preceded by further steps to establish trust between the first part of the software application and the cryptographic unit. The first part of the software application begins by providing a request for a session identifier to the cryptographic unit. Then, the cryptographic unit creates the session identifier, preferably a random number, and returns it.

The first part of the software application then prepares a request for communication comprising the session identifier and the process identifier of its own process. It calculates a keyed hash of the request for communication using the secret key shared with the cryptographic unit and provides both the request and the keyed hash to the cryptographic unit. The cryptographic unit then verifies the keyed hash.

In accordance with an embodiment of the invention the computer system comprises a secure loader. The secure loader, which is responsible for performing the second authentication of the software application, is itself implemented as another software application, its loading and execution preferably controlled directly by the cryptographic unit as described. The secure loader is started by loading it from the non-volatile memory in the volatile memory, performing a first authentication of the secure loader, starting execution of the secure loader after its first authentication, and performing a second authentication of the secure loader during its execution.

In accordance with an embodiment of the invention the computer system is a trusted platform in the sense of the Trusted Computing Group specification. The secure loader is loaded as part of a secure boot process, where the cryptographic unit provides a root of trust for the platform. The secure loader can be seen as a measurement agent on the trusted platform, which measures the dynamic integrity of the running applications. Preferably standard capabilities of the trusted platform are reused for establishing the shared secret between the cryptographic unit and the secure loader, and also for replacing some of the steps in the described protocol that establish trust between the first part of the software application and the cryptographic unit.

BRIEF DESCRIPTION OF THE DRAWINGS

In the following preferred embodiments of the invention will be described in greater detail by way of example only making reference to the drawings in which.

DETAILED DESCRIPTION

Figure 1:
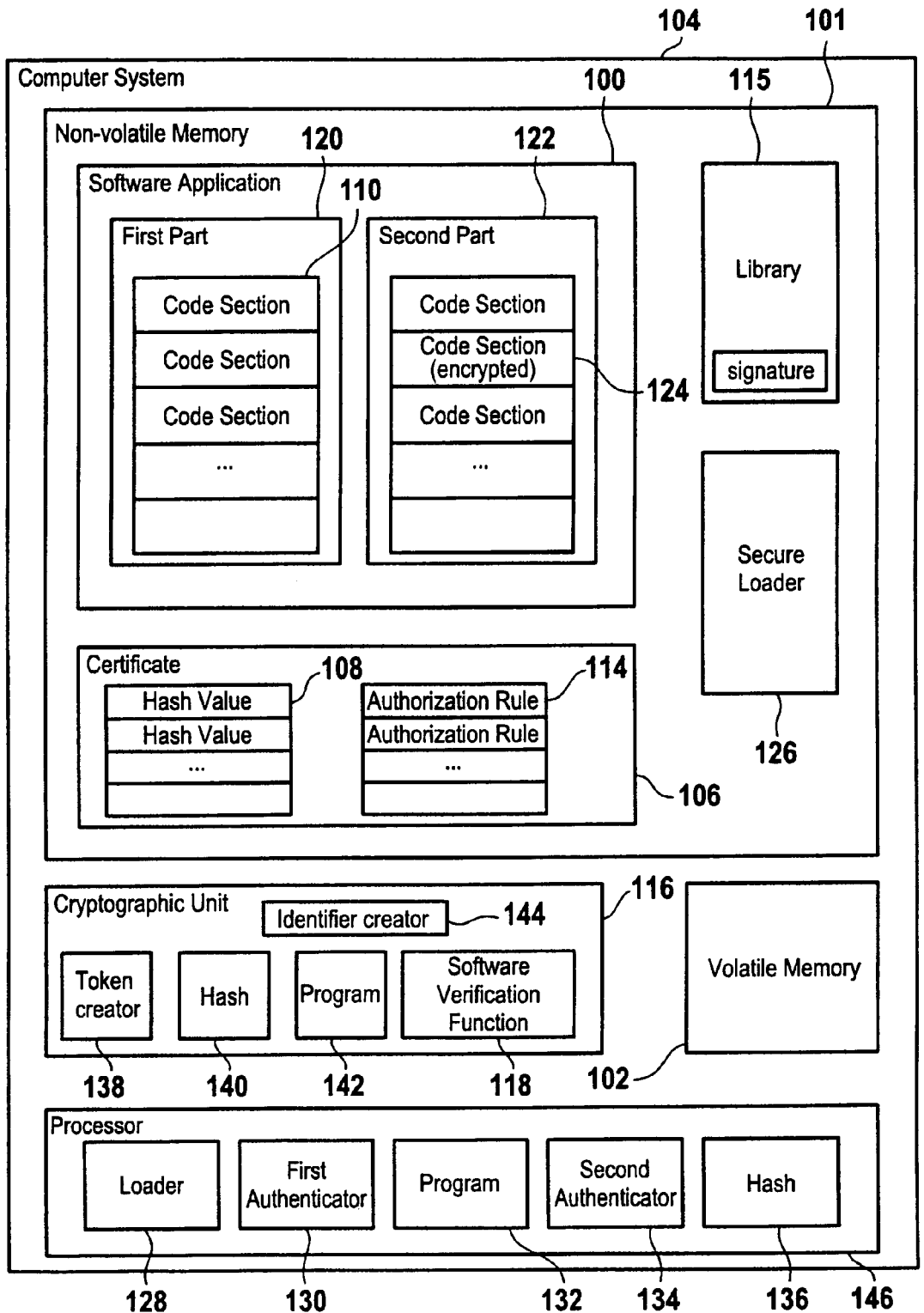
FIG. 1 is a block diagram of a first embodiment of a computer system of the invention.

FIG. 1 shows a computer system 104 comprising a non-volatile memory 101, a volatile memory 102, a cryptographic unit 116 and a processor 146. The non-volatile memory 101, for example a hard disk, stores several files, including a software application 100 and a digital certificate 106 belonging to the software application 100. The digital certificate 106 contains information about the code authorized to be loaded by the software application, in the form of hash values 108 of the code sections 110 of the software application. It can furthermore contain authorization rules 114 governing the execution of the application or allowing dynamic loading of additional code libraries 115 signed by a specific software provider whom the platform owner trusts.

In operation, the processor 146 can execute various program functions. In particular, it can execute a loader function 128 for loading executable code such as the code sections 110 of software application 100 from the non-volatile memory 101 into the volatile memory 102. It furthermore can execute a first authenticator 130 that performs a first authentication of the software application 100. This first authentication includes verifying the integrity of both the code sections 110 to load and of the certificate 108. Using the hashing component 136 hash values of the code sections 110 are calculated and compared to the certified hash values 108 stored in the certificate 106. The first authenticator 130 checks any authorization rules 114 found in the certificate as for example requirements to execute the software application on a specific platform, or in a specific time frame.

After a successful first authentication the processor 146 can execute program instructions 132 for starting execution of the software application 100. During the execution of the software application 100, a second authenticator 134 monitors and checks the integrity of the runtime image either at regular intervals or whenever it detects a change in the runtime image, for example when one of the code libraries 115 is dynamically loaded or unloaded.

The computer system 104 preferably comprises a cryptographic unit 116 having an identifier creator 144 for creating session identifiers, a token creator 138 for creating security tokens, a software verification function 118, a hashing component 140 that is independent of the hashing component 136 of the processor 146, and program instructions 142 of its own. Depending on the nature of the computer system 104 the cryptographic unit 116 can be implemented in different ways. On a trusted platform in the sense of the Trusted Computing Group specification the cryptographic unit can be considered as an extension to the Trusted Platform Module, a simple hardware module that serves as a root of trust for the platform. On non-trusted platforms, it can be implemented in the form of a cryptographic expansion card, or even purely as software.

The cryptographic unit 116 can directly control the loading and execution of the software application 100, under the provision that the software application 100 be divided into a first 120 and a second 122 part, where the first part can be launched as a conventional software application, and the second part may comprise a code section that is encrypted in a way that requires the services of the cryptographic unit for decryption before it can be executed. By requiring these services, the software application 100 is forced to submit itself under the control of the cryptographic unit. To allow the software application 100 and the cryptographic unit 116 to authenticate to each other, they are instructed to share a secret key kept both in the cryptographic unit and by the software application.

In operation, when the processor 146 starts to execute software application 100, a new process is created that loads the code sections 110 of the first part 120 of the software application. The first part of the software application initiates communication with the cryptographic unit by requesting a session identifier. The identifier creator 144 of the cryptographic unit generates a random number and returns it as session identifier to the first part of the software application. The session identifier will remain valid until the software application terminates and serves to protect against replay attacks, where a potential attacker records genuine messages and replays them at a later time. Using the hashing component 136 of the first part of the software application and the secret key shared by the first part of the software application and the cryptographic unit, the first part of the software application then calculates the keyed hash of the request for communication and provides both the request for communication and the keyed hash calculated from it to the cryptographic unit 116. Using its own internal hashing component 140, which employs the same hashing algorithm as the hashing component 136 of the first part of the software application, and the secret key shared with the first part of the software application, the cryptographic unit independently calculates the keyed hash of the request for communication received from the first part of the software application and verifies that the first part of the software application knows the secret key by establishing the identity of the result with the keyed hash supplied by the first part of the software application.

Having in this way authenticated the first part 120 of the software application 100, the cryptographic unit 116 by means of the token creator 138 next creates a token, being essentially a string of bytes that wraps a timeout specification and further information needed by the software application 100 to establish a secure communication channel with the cryptographic unit. The cryptographic unit then executes program instructions 142 to insert the token into a template of a software verification function 118 that is stored by the cryptographic unit. Using its own internal hashing component 140 and the secret key it shares with the first part of the software function, the cryptographic unit then calculates a keyed hash of the bytes of the software verification function including the token. The cryptographic unit then executes further program instructions 142 for sending both the bytes of the software verification function and the keyed hash calculated from it to the first part of the software application.

Having received the software verification function 118 and the keyed hash that the cryptographic 116 unit calculated from it, the first part 120 of the software application 100 verifies the keyed hash by calculating itself a keyed hash of the software verification function using its own hashing component 136 and the secret key it shares with the cryptographic unit If the results are equal, the first part of the software application has authenticated the cryptographic unit, by having established that the cryptographic unit knows the shared secret. The first part of the software application then inserts the software verification function including the token into its own memory space, and instructs it with the name of the second part of the software application that needs to be loaded and potentially decrypted before loading. Finally, it yields control of execution to the software verification function.

Having gained control, the software verification function 118, which is located in the volatile memory 102 spaces of the first part of the software application, returns a copy of the token contained within it to the cryptographic unit 116. As a security measure, the returning of the token has to complete within the timeout specified in the token. The software verification function then takes a snapshot of the code sections 110 of the first part 120 of the software application 100 and sends it for authentication to the cryptographic unit along with a digital signature that is part of the executable file of the first part 120 of the software application. The format of the executable file including the digital signature, which is an encrypted hash value, is explained in FIG. 4.

After the cryptographic unit 116 has the digital signature of the first part 120 of the software application 100, the software verification function 118 sends to the cryptographic unit the bytes of the second part 122 of the software application along with a digital signature that is part of the executable file of the second part of the software application. The cryptographic unit verifies the digital signature of the second part of the software application. If the second part of the software application comprises encrypted code sections the cryptographic unit decrypts these code sections. The cryptographic unit returns the code of the second part of the software application to the software verification function, which loads it into the volatile memory 102 space of the software application. The software verification function then passes control to the second part of the software application. The second part of the software application uses the information contained in the token to establish a secure communication channel with the cryptographic unit.

If the computer system 104 is a trusted platform in the Trusted Computing Group specification, the cryptographic unit provides a root of trust that extends to the software application 100 because the software application 100 is authenticated and therefore trusted by the cryptographic unit. In a similar way, if the cryptographic unit is implemented as a cryptographic expansion card or in software only, a user of the computer system 104, who has confidence in the cryptographic unit, can have confidence in the operation of the software application 100, too.

In principle, any software application can, in the way described for the software application 100, be authenticated by the cryptographic unit 116, provided that it can be built in the same format as described for the software application 100. In particular, it is possible to create a software application that, while itself being authenticated by the cryptographic unit in the way described for the software application 100, is able to authenticate further software applications. The computer system 104 comprises such a software application, called a secure loader 126.

The secure loader 126 is started as described above for software application 100. Preferably the secure loader is loaded and executed under direct control of the cryptographic unit 116, in the same way as described for the software application 100. The secure loader 126 can then in turn securely load, dynamically authenticate, and authorize other software applications.

If the computer system 104 is a trusted platform in the sense of the Trusted Computing Group specification, the secure loader 126 is preferably loaded as part of a secure boot process. The cryptographic unit 116 provides a root of trust that extends to the secure loader, which is authenticated by the cryptographic unit, and via the secure loader to other software applications loaded and authenticated by the secure loader. On a trusted platform where the root of trust is implemented as a low-cost, low-performance hardware module the secure loader is of particular advantage. Because the secure loader is executed by the main processor 146 of the computer system the hardware requirements for the cryptographic unit 126 can be kept modest.

The secure loader 126 can be implemented as a part of the operating system of the Computer system 104, such as an extension of the standard operating system loader.

Figure 2:
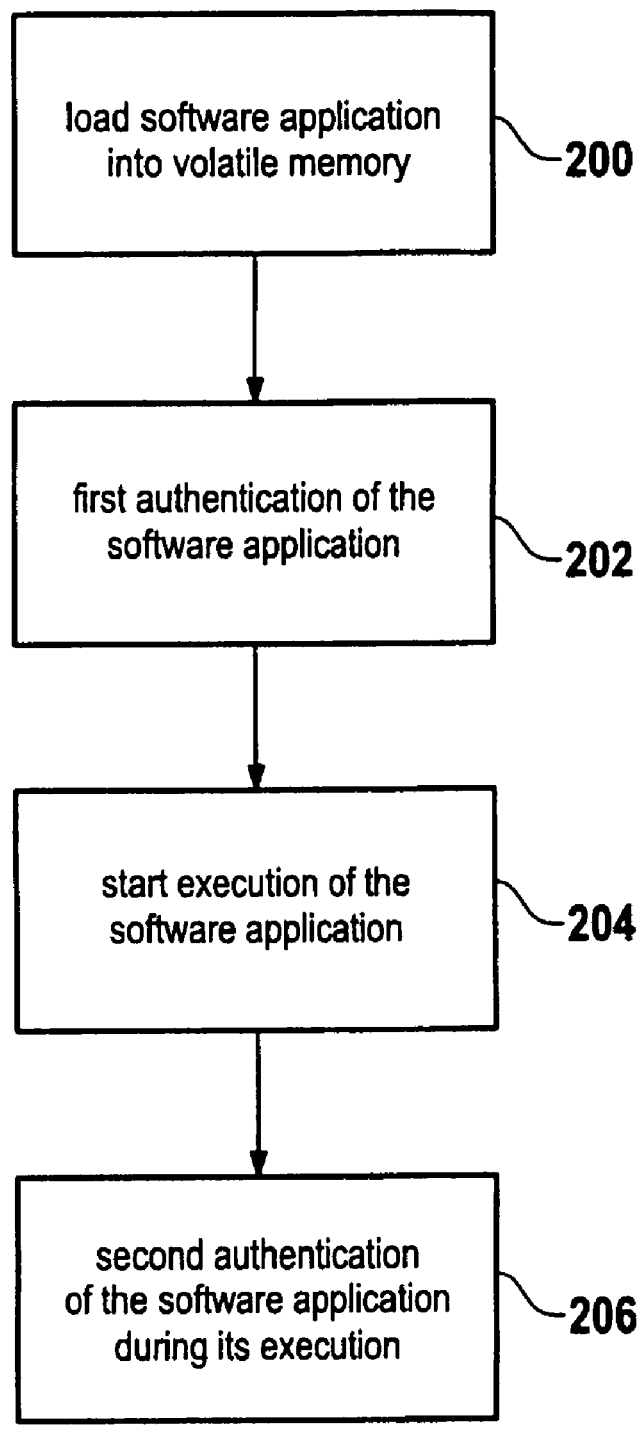
FIG. 2 is a flowchart illustrating a preferred mode of operation of the computer system of FIG. 1 for user authentication.

FIG. 2 shows a flowchart illustrating a computer security method, which comprises steps of secure loading, dynamic authentication, and authorization of a software application. In Step 200, the software application is loaded from the non-volatile memory in the volatile memory. In Step 202, the first authentication of the software application is performed. In Step 204, the execution of the software application is started. In Step 206, the second authentication of the software application is performed.

On a computer system comprising a secure loader, the method is performed twice. First it is performed with respect to the secure loader, preferably under control of a cryptographic unit of the computer system, and preferably as part of a secure boot process on a trusted platform in the sense of the Trusted Computing Group specification, where the cryptographic unit serves as a root of trust of the system. In Step 200, the secure loader is loaded from the non-volatile memory in the volatile memory. In Step 202, the first authentication of the secure loader is performed, In Step 204, the execution of the secure loader is started. In Step 206, the second authentication of the secure loader is performed. As a result, on a trusted platform, trust extends from the cryptographic unit as root of trust to the secure loader.

Second, the method is performed by the secure loader with respect to another, securely loaded software application. In Step 200, the secure loader loads the securely loaded software application from the non-volatile memory in the volatile memory. In Step 202, the secure loader performs the first authentication of the securely loaded software application. In Step 204, the secure loader starts the execution of the securely loaded software application. In Step 206, the secure loader performs the second authentication of the securely loaded software application. As a result, on a trusted platform, trust extends from the cryptographic unit as root of trust to the secure loader, and via the secure loader to the securely loaded software application.

Figure 3:
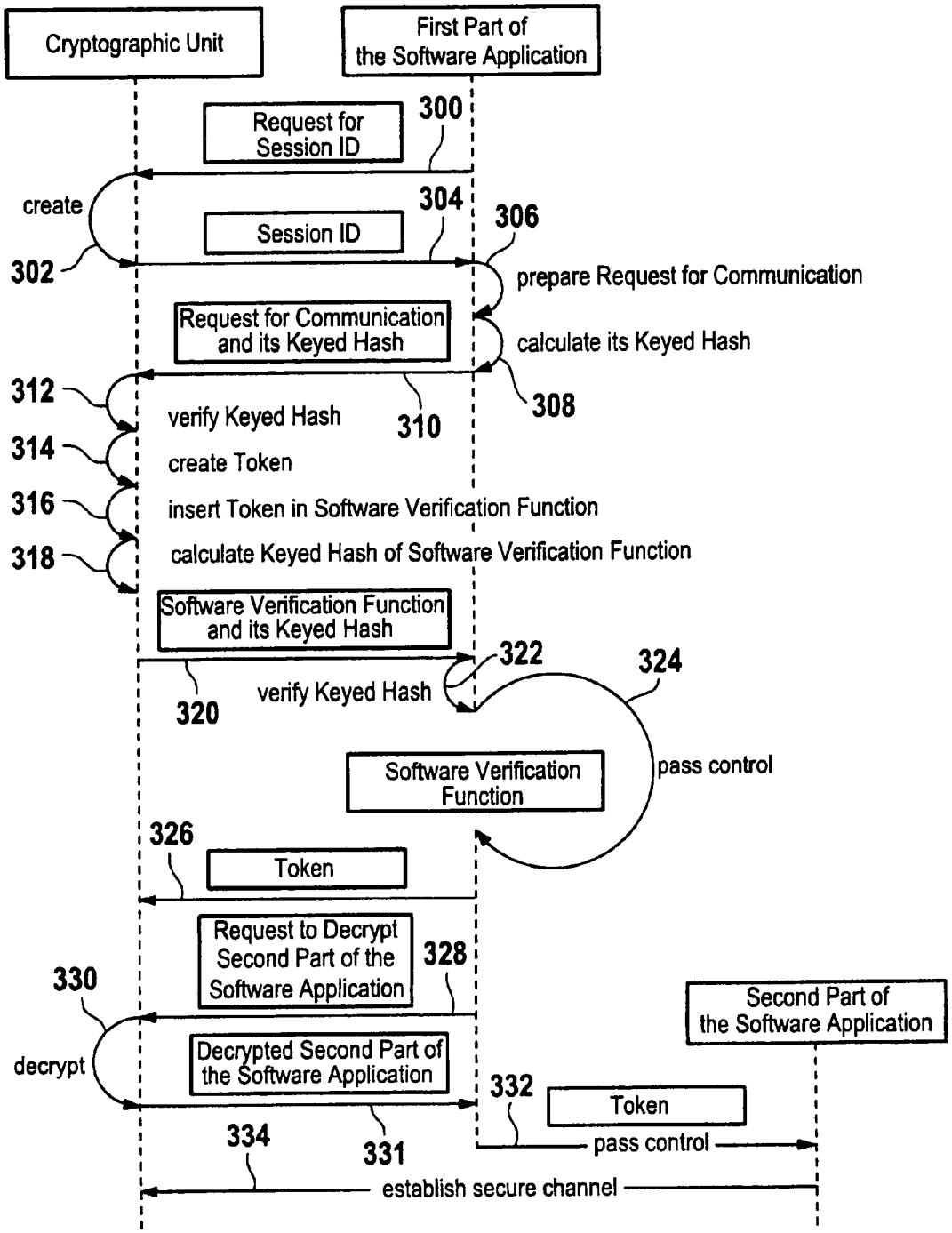
FIG. 3 is an object relationship diagram illustrating a preferred protocol for starting a software application.

FIG. 3 shows an object-relationship diagram illustrating a protocol by which the cryptographic unit starts the software application, which in order to be directly controlled by the cryptographic unit needs to be separated into a first and second part. After the start of the execution of the first part of the software application it requests (300) a session identifier from the cryptographic unit. The cryptographic unit creates (302) the session identifier and provides (304) it back to the first part of the software application. The first part of the software application then prepares (306) a request for communication intended for the cryptographic unit. To prove the authenticity of the request to the cryptographic unit, the first part of the software application calculates (308) and attaches a message-authentication code using a secret key that is known also to the cryptographic unit. The message authentication code preferably is a keyed hash based on a cryptographic hash function such as MD5 or SHA-1 and the secret key, calculated according to the method described by H. Krawczyk, M. Bellare, and R. Canetti in "HMAC: Keyed-Hashing for Message Authentication," Internet Engineering Task Force, Request for Comments (RFC) 2104, February 1997. The first part of the software application provides (310) the request for communication and its keyed hash to the cryptographic unit, which verifies (312) the keyed hash, creates (314) a token comprising a timeout and information for establishing a secure communication channel with the cryptographic unit, inserts (316) the token into the software verification function it stores, and calculates (318) a keyed hash of the resulting bytes using the same secret key. The cryptographic unit then provides (320) the software verification function including the inserted token and its keyed hash to the first part of the software application, which verifies (322) the keyed hash and passes control to the software verification function, which now resides within the software application's memory space in the volatile memory.

The software verification function immediately provides back (326) the token to the cryptographic unit. This has to occur within the limit set by the timeout, which should be as short as possible for maximum security. The software verification function then requests (328) the cryptographic unit to decrypt any encrypted code sections of the second part of the software verification function. The cryptographic unit fulfils (330) the request and provides (331) the decrypted code to the software verification function, which passes (332) execution control and the token to the second part of the software application. The second part of the software application then uses this information to establish a secure communication channel with the cryptographic unit.

Figure 4:
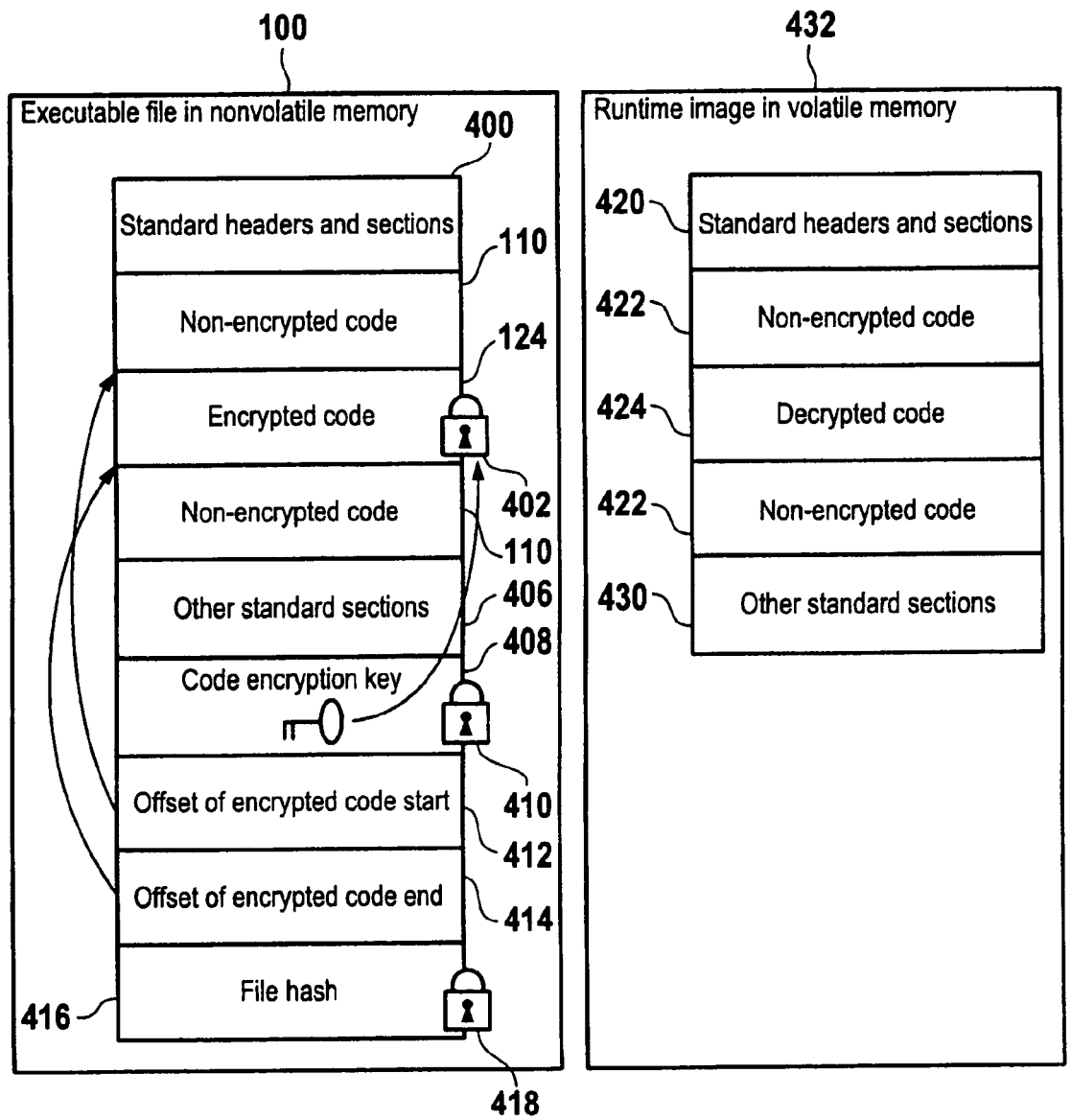
FIG. 4 is a juxtaposition of a preferred executable file format of a software application and its runtime image in volatile memory.

FIG. 4 shows a juxtaposition of a possible format of an executable file of the software application 100 suitable for being securely loaded with a corresponding runtime image 432 in volatile memory. The depicted format of the executable file is based on the standard executable format of Microsoft Windows executables but the principle considerations are equally valid on other platforms. At the beginning of the executable file 100 are located standard headers and sections 400 as can be found also in executable files of the standard executable format. During loading of the software application these standard headers and sections are copied into volatile memory, where their image 420 forms the head end of the software application's runtime image 432 in volatile memory. The standard headers and sections 400 are followed by non-encrypted code sections 110, as can be found in the same way in executable files of the standard executable format. The non-encrypted code sections are copied to corresponding sections 422 of the software application's runtime image in volatile memory, possibly subject to post-processing depending on the location of the code in volatile memory.

A part of the code of the software application 100 is located in encrypted code sections 124 that can be sandwiched by sections of non-encrypted code. Such sections are not part of the standard executable format. During the loading of the software application 100 the encrypted code sections are decrypted before being added as further, decrypted, code sections 424 to the runtime image, subject to post-processing depending on the location of the decrypted code in volatile memory. Following the non-encrypted 110 and encrypted 124 code sections in the executable file 100 are further standard sections 406 as are found also in executable files of the standard executable format. These sections are copied during loading to form the tail end of the software application's runtime image, resulting in a runtime image 432 in volatile memory that is of the same format as a runtime image of a standard executable file.

The executable file further comprises a code encryption key 408 that was used for the encryption 402 of the code of the encrypted code section 124. This key 408 is either supplied by the software creator or by the platform owner, possibly during installation of the software application 100. The key 408 itself is subject to asymmetric encryption 410 using a public key of a public-private key pair, the private key of which is stored in the cryptographic unit 116. If the computer system 104 is a trusted platform in the sense of the Trusted Computing Group specification the public key used could be part of an identity credential of the platform. The executable file further comprises pointers to the offset of the start 412 and the end 414 of the encrypted code section 124 serving to identify which part of the executable file has to be decrypted. Note that an executable file structured as depicted 100 could contain further encrypted code sections, each encrypted with different encryption keys stored in the file 100.

The final section 416 of the depicted executable file 100 contains as digital signature a hash valve calculated from the rest of the executable file 100. The hash value is subject to encryption 418 with the private key of the software creator or the platform owner. If the private key of the platform owner is used and the computer system 104 is a trusted platform in the sense of the Trusted Computing Group specification, the execution of the software application 100 could be bound to a specific platform identity.

LIST OF REFERENCE NUMERALS

100 Software application
101 Non-volatile memory
102 Volatile memory
104 Computer system
106 Certificate
108 Hash value
110 Code section
114 Authorization rule
115 Library
116 Cryptographic unit
118 Software verification function
120 First part of the software application
122 Second part of the software application
126 Secure loader
128 Loader
130 First authenticator
132 Program instructions
134 Second authenticator
136 Hashing component
138 Token creator
140 Hashing component
142 Program instructions
144 Identifier creator
146 Processor
200 Loading into volatile memory
202 First authentication
204 Start of execution
206 Second authentication
300 Request for session identifier
302 Creation of session identifier
304 Provision of session identifier
306 Preparation of request for communication
308 Calculation of keyed hash of request for communication
310 Provision of request for communication
312 Verification of keyed hash
314 Creation of token
316 Insertion of token into software verification function
318 Calculation of keyed hash of software verification function
320 Provision of software verification function
322 Verification of keyed hash
324 Passing of control to software verification function
326 Provision of token
328 Provision of request to decrypt
330 Decryption
331 Provision of decrypted second part of software application
332 Passing control to second part of software application
334 Establishing of secure channel
400 Standard headers and sections
402 Encryption by code encryption key
406 Other standard sections
408 Code encryption key
410 Encryption by public key of cryptographic unit
412 Offset of encrypted code start
414 Offset of encrypted code end
416 File hash
418 Encryption by private key of platform owner or software creator
420 Runtime image of standard headers and sections
422 Runtime image of non-encrypted code
424 Runtime image of encrypted code
430 Runtime image of other standard sections

The invention claimed is:

1. A computer security method comprising:
loading a software application from a non-volatile memory into a volatile memory of a computer system by a secure loader, where the software application is associated with characteristic information and where the characteristic information includes a pre-execution characteristic value of the software application;

performing a first authentication of the software application;
starting execution of the software application after the first authentication; and
performing a second authentication of the software application during the execution comprising:
calculating an execution characteristic value of a runtime image of the software application; and
determining if the pre-execution characteristic value and the execution characteristic value match.

2. The method of claim 1, further comprising repeatedly performing the second authentication of the software application during execution.

3. The method of claim 1, further comprising loading a certificate certifying the software application, and performing the second authentication using the certificate, where the certificate comprises the characteristic information.

4. The method of claim 3, the certificate comprising a certified hash value of a code section belonging to the software application, where the certified hash value is the pre-execution characteristic.

5. The method of claim 4, where the execution characteristic value is a current hash value of the code section and where determining if the pre-execution characteristic value and the execution characteristic value match comprises determining for the code section whether the current hash value matches the certified hash value.

6. The method of claim 3, the certificate further comprising an authorization rule for:
binding execution of the software application to a specific platform identity,
limiting the number of executions, allowing only parts of the code of the software application to be used on a particular platform, or
allowing dynamic loading of code sections from a library signed by a specific software provider.

7. The method of claim 1, further comprising preventing execution of at least part of the software application if the determination shows there is not a match.

8. The method of claim 1, where the performing the second authentication occurs at regular intervals.

9. The method of claim 1, wherein the computer system comprises a cryptographic unit having a software verification function, the software application comprising a first and a second part, the method further comprising:
creating a token specifying a timeout and comprising information necessary for establishing a secure communication channel by the cryptographic unit,
inserting the token into the software verification function by the cryptographic unit,
calculating a keyed hash of the software verification function by the cryptographic unit with a key that is known to both the first part of the software application and the cryptographic unit,
providing both the software verification function and the keyed hash of the software verification function to the first part of the software application by the cryptographic unit,
verifying the keyed hash of the software verification function by the first part of the software application,
passing control to the software verification function by the first part of the software application,
providing the token to the cryptographic unit before the timeout expiration specified in the token by the software verification function,
passing control to the second part of the software application and providing the token to the second part of the software application by the software verification function, and
establishing a secure communication channel with the cryptographic unit by the second part of the software application.

10. The method of claim 9, wherein the second part of the software application comprises an encrypted section, the method further comprising providing a request to decrypt the encrypted section to the cryptographic unit by the software verification function, before passing control to the second part of the software application.

11. The method of claim 9, the software application comprising a process identifier, the method further comprising, before the creating the token:
providing a request for a session identifier to the cryptographic unit by the software application,
creating the session identifier and providing it to the software application by the cryptographic unit,
preparing a request for communication comprising the session identifier and the process identifier of the software application by the software application,
calculating a keyed hash of the request for communication with a key that is known to both the software application and the cryptographic unit by the software application,
providing both the request for communication and the keyed hash of the request for communication to the cryptographic unit by the software application, and
verifying the keyed hash of the request for communication by the cryptographic unit.

12. The method claim 1, the secure loader performing the second authentication of the software application, the method further comprising, before loading the software application:
loading the secure loader from the non-volatile memory in the volatile memory,
performing a first authentication of the secure loader,
starting execution of the secure loader after its first authentication, and
performing a second authentication of the secure loader during its execution.

13. The method of claim 12, wherein the computer system is a trusted platform and the secure loader is loaded as part of a secure boot process.

14. The method of claim 1 comprising:
loading a certificate certifying the software application;
performing the second authentication using the certificate, where the certificate comprises the characteristic information and where the certificate comprises an authorization rule for:
binding execution of the software application to a specific platform identity,
limiting the number of executions, allowing only parts of the code of the software application to be used on a particular platform, or
allowing dynamic loading of code sections from a library signed by a specific software provider; and
repeatedly performing the second authentication of the software application during execution during regular intervals.

15. A computer system comprising:
a secure loader for loading a software application from a non-volatile memory in a volatile memory of the computer system, where the software application is associated with a certificate and where the certificate includes a certified hash value for a code section of the software application;

a first authenticator for performing a first authentication of the software application;

program instructions for starting execution of the software application after its first authentication; and a second authenticator for performing a second authentication of the software application during execution of the software application, the authentication comprising:

calculating a current hash value during runtime for the code section of the software application; and determining if the certified hash value and the current hash value match.

16. The computer system of claim 15, further comprising a cryptographic unit having a software verification function, the software application comprising a first and a second part, the computer system further comprising:

a token creator operable for creating a token specifying a timeout and comprising information necessary for establishing a secure communication channel by the cryptographic unit, program instructions for inserting the token into the software verification function by the cryptographic unit, a hashing component for calculating a keyed hash of the software verification function by the cryptographic unit with a key that is known to both the first part of the software application and the cryptographic unit, program instructions for providing both the software verification function and the keyed hash of the software verification function to the first part of the software application by the cryptographic unit, a hashing component for verifying the keyed hash of the software verification function by the first part of the software application, program instructions for passing control to the software verification function by the first part of the software application, program instructions for providing the token to the cryptographic unit before the timeout expiration specified in the token by the software verification function, program instructions for passing control to the second part of the software application and providing the token to the second part of the software application by the software verification function, and program instructions for establishing a secure communication channel with the cryptographic unit by the second part of the software application.

17. The computer system of claim 16, wherein the second part of the software application comprises an encrypted section, the computer system further comprising program instructions for providing a request to decrypt the encrypted section to the cryptographic unit by the software verification function, before passing control to the second part of the software application.

18. The computer system of claim 16, the software application comprising a process identifier, the computer system further comprising:

program instructions for providing a request for a session identifier to the cryptographic unit by the software application, an identifier creation component for creating the session identifier and providing it to the software application by the cryptographic unit, program instructions for preparing a request for communication comprising the session identifier and the process identifier of the software application by the software application, a hashing component for calculating a keyed hash of the request for communication with a key that is known to both the software application and the cryptographic unit by the software application, program instructions for providing both the request for communication and the keyed hash of the request for communication to the cryptographic unit by the software application, and a hashing component for verifying the keyed hash of the request for communication by the cryptographic unit.

19. The computer system of claim 15, the secure loader being adapted to act as the authenticator for performing the second authentication of the software application, the computer system further comprising:

a loader for loading the secure loader from the non-volatile memory in the volatile memory of the computer system, an authenticator for performing a first authentication of the secure loader, program instructions for starting execution of the secure loader after its first authentication, and an authenticator for performing a second authentication of the secure loader during its execution.

20. A computer system comprising:

means for securely loading a software application from a non-volatile memory in a volatile memory of the computer system, where the software application is associated with characteristic information and where the characteristic information includes pre-execution characteristic value for code sections of the software application;

means for performing a first authentication of the software application, means for starting execution of the software application after its first authentication, and means for performing a second authentication of the software application during execution of the software application, the authentication comprising:

calculating execution characteristic values during runtime for the code sections of the software application; and determining if the pre-execution characteristic values and the execution characteristic values match.

\* \* \* \* \*

UNITED STATES PATENT AND TRADEMARK OFFICE
CERTIFICATE OF CORRECTION

PATENT NO.       : 8,051,299 B2
APPLICATION NO.  : 11/378304
DATED            : November 1, 2011
INVENTOR(S)      : Louisa Saunier It is certified that error appears in the above-identified patent and that said Letters Patent is hereby corrected as shown below:

In column 2, line 24, below "management." insert -- In accordance with an embodiment of the invention the secure loader is implemented as a part of the operating system of the computer system, such as an extension of the standard operating system loader. --.

In column 12, line 32, in Claim 12, after "method" insert -- of --.

Signed and Sealed this
Thirty-first Day of July, 2012

David J. Kappos
*Director of the United States Patent and Trademark Office*